(No Model.)
F. WESTERMAN.
DEVICE FOR PREVENTING LEAKAGE ABOUT JOURNALS OF MIXING MACHINES.
No. 528,050.  Patented Oct. 23, 1894.
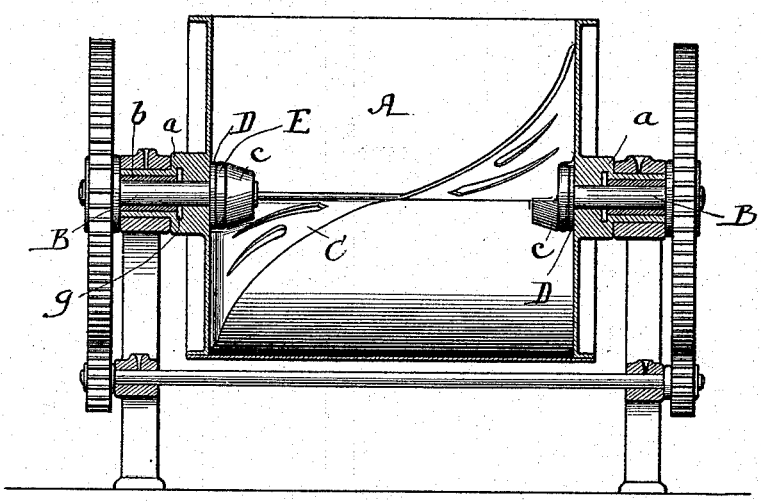
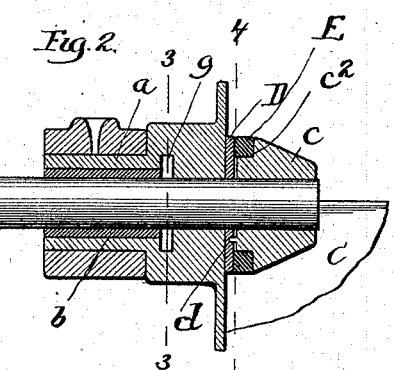 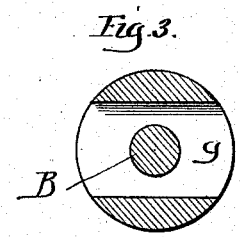 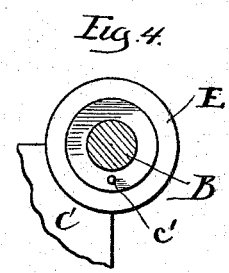
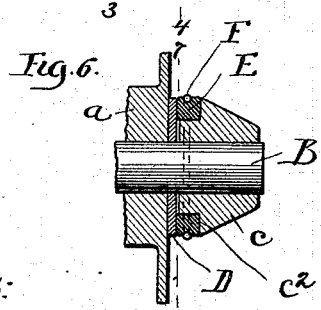 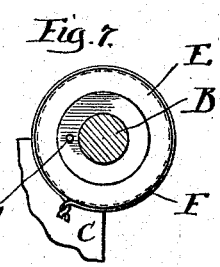 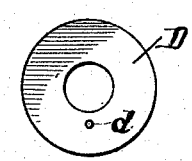
Witnesses:
Fred Gerlach
Alberta Adamick
Inventor:
F. Westerman
By Peirce & Fisher
Attorneys.

UNITED STATES PATENT OFFICE.

FREDERICK WESTERMAN, OF CHICAGO, ILLINOIS.

DEVICE FOR PREVENTING LEAKAGE ABOUT JOURNALS OF MIXING-MACHINES.

SPECIFICATION forming part of Letters Patent No. 528,050, dated October 23, 1894.

Application filed June 25, 1894. Serial No. 515,591. (No model.)

*To all whom it may concern:*

Be it known that I, FREDERICK WESTERMAN, a citizen of the United States, residing in the city of Chicago, county of Cook, and State of Illinois, have invented certain new and useful Improvements in Devices for Preventing Leakage About the Journals of Mixing and other Machines, of which I do declare the following to be a full, clear, and exact description, reference being had to the accompanying drawings, forming a part of this specification.

In the use of mixing machines, such as are employed by bakers in the manufacture of dough, batter and the like, it is found in practice that even with the greatest precaution there is danger of leakage from the interior of the mixing chamber around the journals of the mixing blades, where these journals project through the end walls of the chamber. Dough or the like within the chamber usually contains yeast and like material of such character that it corrodes or eats away the bearings of the journals so that the leakage speedily increases until it becomes necessary to renew this part of the machine.

My present invention has primarily for its object to provide means whereby the leakage around the journals of the mixing blades of mixing machines can be effectively guarded against, but it is manifest that while the invention is shown as applied to a mixing machine it will be found useful also in other machines in which it is desired to guard against the escape of fluid from the interior of the machine around the journals of the part projecting through the wall of the machine.

To this end my invention consists in the improvement hereinafter described, illustrated in the accompanying drawings and particularly defined in the claims at the end of this specification.

Figure 1 is a view in vertical longitudinal section through a mixing machine embodying my invention. Fig. 2 is an enlarged detail view in vertical longitudinal section through the end portion of the machine about the journal bearing. Fig. 3 is a view in vertical transverse section on line 3—3 of Fig. 2. Fig. 4 is a view in vertical transverse section on line 4—4 of Fig. 6. Fig. 5 is a detail face view of the ring or plate adjacent the end wall of the mixing machine. Fig. 6 is a view in horizontal section through the end wall of the mixing chamber and parts adjacent thereto. Fig. 7 is a view in vertical cross section on line 7—7 of Fig. 6.

As the journals and journal bearings at both ends of the machine are of like construction in the machine illustrated in the accompanying drawings, a description of the mechanism at one end of the machine will suffice for both.

A designates the body of the mixing chamber through the end walls of which project the journals B of the mixing blade C. Each of the end walls of the mixing chamber A is provided with a journal bearing $a$ cast in one piece therewith or suitably attached thereto, this bearing serving to sustain the journal B and being preferably provided with a bushing $b$ of brass or like material. The journal B projects from the hub $c$ of the mixing blade C and between the hub $c$ and the end wall of the chamber A is interposed a plate or ring D that encircles the journal B. The plate or ring D is preferably caused to revolve with the journal B by means of a lug $c'$ that projects from the hub $c$ into a suitable seat $d$ formed in the inner face of the plate or ring D. Between the hub $c$ and the plate or ring D is interposed an elastic ring E that is preferably set within an annular rabbet or groove $c^2$ formed in the periphery of the hub $c$. This elastic ring E serves to force the plate D into close bearing with the end wall of the mixing chamber and thus prevents the escape of fluid through the end wall of the mixing chamber. Preferably the elastic ring D is encircled by a tightening band or wire F by means of which a lateral expansion of the ring can be had (this ring being by preference of rubber) when the elastic ring has become set or if it is desired to secure a tighter bearing between the plate D and the end wall of the chamber.

The tightening band or wire F is shown as consisting of a simple wire encircling the elastic ring E, the ends of the band F being twisted together as seen in Fig. 7, so that when it is desired to expand the ring E it is only necessary to twist the ends of the wire in order to shorten the band F and thus spread the ring E.

From the foregoing description it will be seen that by reason of the close bearing between the plate or ring D and the end wall of the chamber A the escape of fluid from the mixing chamber is effectively guarded against, since the elastic ring E insures a close bearing of the plate or ring D at all times against the inner face of the end wall.

In order to guard against the possibility of access to the bushing $b$ of any fluid that might possibly escape from the interior of the chamber A, I prefer to provide a pocket or open space $g$ around the journal B and between the end wall of the chamber A and the bushing or bearing $b$; and it is obvious that if any liquid should escape from the interior of the chamber around the journal B it will pass into the pocket $g$ from which it will escape by a suitable opening and will not gain access to the bushing $b$. In the form of the invention shown, the pocket $g$ is open at its sides as seen in Fig. 3, as this affords a simple way for insuring the escape of any material that may pass into the pocket or open space $g$.

It is manifest that the precise details of construction above set out may be varied without departing from the spirit of my invention and that the features of novelty hereinafter claimed may be used in other types of machines than that in connection with which they are here illustrated.

Having thus described my invention, what I claim as new, and desire to secure by Letters Patent, is—

1. The combination with the end wall of a chamber, a bearing outside of said end wall and a shaft B within said bearing, of a ring or plate D encircling said shaft inside said end wall and an elastic ring E encircling said shaft and serving to thrust outward said plate or ring D, substantially as described.

2. The combination of an end wall of a chamber having a bearing $a$ outside thereof provided with a pocket $g$, a shaft B within said bearing, a plate or ring D mounted upon said shaft, an elastic ring E supported by said shaft and serving to thrust outward said plate or ring D, substantially as described.

3. The combination with the end wall of a chamber, a bearing outside said end wall, a shaft B journaled within said bearing, a plate or ring D encircling said shaft, an elastic ring E for forcing said plate or ring D against the inner face of said end wall and a tightening ring or band F for laterally expanding said elastic ring E, substantially as described.

FREDERICK WESTERMAN.

Witnesses:
GEO. P. FISHER, Jr.,
FRED. GERLACH.